United States Patent [19]
Cleaveland

[11] 3,793,562
[45] Feb. 19, 1974

[54] WITH INSULATING BATTLE SUPPORTING TERMINAL CONDUCTORS

[75] Inventor: Charles M. Cleaveland, Irwin, Pa.

[73] Assignee: Westinghouse Electric Corporation, Pittsburgh, Pa.

[22] Filed: Mar. 22, 1973

[21] Appl. No.: 344,010

[52] U.S. Cl....... 317/103, 174/DIG. 10, 174/152 R, 317/120
[51] Int. Cl............................................. H02b 1/20
[58] Field of Search..... 317/103, 120; 174/DIG. 10, 174/152 R, 151

[56] References Cited
UNITED STATES PATENTS

| | | | |
|---|---|---|---|
| 3,461,348 | 8/1969 | Eichelberger | 317/103 |
| 2,767,265 | 10/1956 | Davidson | 317/103 |
| 3,222,625 | 12/1965 | Ledocq | 174/DIG. 10 |
| 2,809,358 | 10/1957 | Whitney | 174/DIG. 10 |

Primary Examiner—Robert K. Schaefer
Assistant Examiner—Gerald P. Tolin
Attorney, Agent, or Firm—H. G. Massung

[57] ABSTRACT

A metal-clad or metal enclosed switchgear cell in which an improved insulating bottle construction is provided for supporting the terminal conductors which a draw-out circuit interrupter engages during normal operation. An improved scheme for mounting necessary current transformers to the insulating bottles is also provided. The main conducting bus is constructed and arranged so that a 4,000 amp self-cooled rating is achieved, and main bus bracing supports are constructed so that the switchgear cell can withstand over 100,000 amps rms asymmetrical momentary current without damage. A simplified lifting scheme is provided, and an indoor switchgear cell can be quickly converted for outdoor use with the addition of a roof and gaskets only.

17 Claims, 18 Drawing Figures

WITH INSULATING BATTLE SUPPORTING TERMINAL CONDUCTORS

CROSS-REFERENCE TO RELATED APPLICATIONS

Portions of the invention disclosed in this application are related to copending application U.S. Pat. Office, Ser. No. 302,623, filed 10/31/72 Westinghouse Case No. 40,602.

BACKGROUND OF THE INVENTION

This invention relates generally to metal-clad switchgear and more particularly to the cell structure which houses large draw-out type circuit interrupters or circuit breakers.

Vertical lift draw-out circuit breakers and bushing supports of primary contacts have proven to be difficult and expensive to use. Horizontal draw-out type circuit breakers and insulating bottle supports of primary contacts are basic ingredients for minimizing costs. Prior art insulating bottles are constructed almost entirely of porcelain and these have proved to be relatively fragile and difficult to handle. Prior art cell constructions have also experienced difficulties in mounting required current transformers around the porcelain insulating bottles.

In metal-clad switchgear, it is desirable to support the conducting members with porcelain insulation, due to the excellent track resistance characteristics of porcelain. However, the forces of attraction and repulsion between current carrying members under momentary high currents make it difficult to prevent breaking of the porcelain during high current surges. In some prior art main bus supporting constructions, it is difficult to get porcelain bus supports which can withstand an 80,000 amp momentary current. With increased supply system capacities, it is desirable to have a main bus support constructed of porcelain which can withstand more than 100,000 amperes rms symmetrical.

In prior art constructions, outdoor switchgear cells or units are constructed by building an entire second weatherproof cell or housing around the indoor cell. Thus, the outdoor switchgear cell has two floors, two sets of doors, two sets of walls, and two roofs, which has proven to be time-consuming to build and expensive. Present indoor cells are lifted by a channel cross beam that is bolted, during shipping, onto the top of the switchgear cell. Outdoor cells are lifted by the channel floor. Sections of the sloping weatherproofing roof must be left off to provide for a shield between the lifting cables and the cell walls. The roof assembly must then be completed in the field. Field assembly of a portion of the switchgear unit is undesirable.

In some of the prior art constructions, it was necessary to use forced cooling and copper conductors to provide high current ratings. It is desirable to have self-cooled main bus constructed of aluminum with a continuous current rating of at least 3,000 amps. In prior art switchgear constructions, it has been customary practice to ship the draw-out type circuit breaker separate from the switch-gear cell. If the draw-out circuit breaker can be shipped in the switchgear cell, advantages in shipping and handling can be obtained.

SUMMARY OF THE INVENTION

According to the preferred embodiment of the present invention, there is provided a switchgear cell or housing for receiving a truck-mounted circuit breaker which engages primary electrical contacts when positioned in the switchgear cell. The primary contacts are supported by an enveloping or encompassing electrically insulating bottle structure, a portion of which is formed of ceramic or porcelain material. A member comprising a porcelain tube is used to support the primary contact and conducting tube portions. The bottle structure is constructed so that the porcelain tube is surrounded by a current transformer, and the outer diameter of the porcelain tube together with the current transformer is encapsulated with epoxy or some other suitable insulating material. This combined construction of an encapsulated current transformer with a porcelain tube lowers cost and provides a superior insulation system. In a variation of the invention, the porcelain bottle is replaced by a polyester bottle and two porcelain spaced apart annular rings which are held in place by the surrounding insulating material. A tubular portion of the primary contact is supported between the two porcelain annular rings or donuts. This has all the advantages listed above plus the advantage that the porcelain is minimized and simplified. This arrangement also has the advantage that the fragile porcelain bottle is now protected from breakage by the surrounding polyester bottle. In another modification of this construction, the porcelain donuts are held in place by the epoxy, glass-polyester, or other suitable electrically insulating material and a cavity or recess is formed to accept or receive the current transformers, when required. The cavity molded insulating support is open at one end to receive current transformers. The cavity has a slight taper so that current transformers can be positioned so they tightly engage the molded cavity portion, and then the open end of the cavity can be sealed with an insulating foam. In this construction, the porcelain donuts are held in place by the primary contact and the tubular conducting member which they support.

In metal-enclosed switchgear, it is desirable to support the main bus with porcelain insulation. The means for using porcelain to support the main bus disclosed in the instant application gives a higher momentary current rating than available with prior art supporting means. As in the prior art, flat porcelain slabs, having apertures therethrough to receive the main bus, are used. However, in the construction disclosed in the instant application, porcelain slabs are held around their entire circumference. The high momentary capability is obtained by bonding the porcelain slabs to a glass-polyester frame with a flexible epoxy material. In prior art constructions, the porcelain slabs were mechanically clamped together and were free to impact within the elastic limits of the clamp. The polyester frame and porcelain slabs in the new support are put in a jig and epoxy material is poured around the entire circumference of each slab. An alternate assembly is to cast the entire frame from epoxy. The frame with the porcelain slabs attached makes an assembly that is mounted on and secured to the cell wall. The assembly is slipped onto studs and bolted to the cell wall. The studs that attach the support frame assembly to the cell wall are located across the top and bottom of the opening cut in the cell wall. There are no mounting studs along the sides of the opening in the cell wall. This allows the largest possible air gap between the bus bar and the metal cell partition permitting a wider window in the cell wall and increasing dielectric clearance to the cell wall. This wider window in the cell wall allows the main bus conductors to be spaced further apart thus decreasing the magnetic forces between the main bus, due to current flowing therein. Also, the slabs are held by both compression and tension restraints. Not only are the slabs cushioned by the flexible epoxy, but bouncing is impossible. In some prior art supports, which utilize rubber strips, the porcelain slabs are cushioned but bouncing is not prevented.

With prior art switchgear cells, lifting from the top is sometimes relatively difficult. With the disclosed lifting means, the cell is completely assembled in the shop and lifting is done in the same way for both indoor and outdoor switchgear cells. Both indoor and outdoor switchgear cells lift from the top of the cell by way of lifting tabs formed from the cell walls. The switchgear cells are made with a portion of the steel sheets which form the cell walls extending above the top cover sheets, providing hook-on-points at four locations per cell. Each side sheet has two hook-on-points. When the cell is of the indoor variety, lifting tabs are bolted to the cell hook-on-points and cable can be attached through large holes provided in the lifting tabs. A spreader is used so that the cell wall hook-on points and the lifting tabs are stressed in tension only. Thus, the cell wall which is a thin but wide sheet is stressed only in tension and this provides maximum strength for lifting the switchgear cell structure.

When outdoor switchgear is required, the lifting tabs are used as roof supports and are tied to supporting members which hold slanted roof panels. The supporting members are also tied to a lifting shackle assembly which extends above the outdoor roof panels. The lifting shackle is constructed from two J-shaped pieces, with the short legs of the J-shaped pieces attached to an up-turned lip portion formed on the roof panels. A lifting member is attached between the two long legs of the J-shaped pieces and is used as the hook-on-point when lifting the cell. A channel-shaped piece is fit over the upturned lip of the roof panels between cells for weatherproofing. The lifting shackle fits under this channel shaped cover to permit lifting of the switchgear cell without holes through the weatherproof roof. If it was necessary to provide holes in the lifting roof, this would have the disadvantage of the requiring gasketing for weatherproofing. The disclosed outdoor construction uses the basic indoor switchgear cell with a sloping roof and gasketing added at the doors and side panels, to provide a weatherproof construction. To make the indoor cell suitable for outdoor application, channels are also added under the floor of the indoor switchgear cell. In short, to make an outdoor cell, you put on a sloping roof and add gasketing and channels to an ordinary indoor cell. The outdoor cell can be lifted from the roof without creating a weather sealing problem. This construction eliminates many parts and results in a substantial cost saving.

In the disclosed switchgear construction, there are three compartments across the top of the cell from front to back. The middle and rear compartments can have bus, also, the front auxiliary compartment can have bus. Both the front and rear compartments are used to complement the middle compartment which normally carries the main bus. The front auxiliary compartment for control power transformers, potential transformers, fuses, lightning arresters, disconnects, batteries, field control equipment, etc. is located for easy access inside the front door of the switchgear cell. The result is that extra cells for this equipment can be eliminated in most applications. Since the space on either side of the middle compartment can be used for bus compartments, tie breaker and transfer bus schemes can be constructed without superstructures being added above the middle or bus compartment, as is common practice in switchgear today. This provides a cost reduction and offers more flexibility in bus alternatives than is presently available in some prior art structures.

With the disclosed switchgear cell construction, a 3,000 amp main bus structure self-cooled, and constructed from aluminum can be built. Provisions are made in every compartment to permit the flow of air in and out. The air does not mix from compartment to compartment so that barrier standards are adhered to. To provide air flow into the middle main bus compartment, ducts are provided along the sides of the cell. The air does not come from the rear compartment. The ducts are situated so that they do not interfere with potheads, rear current transformers and are clear of high voltage conductors. No grill is needed on the front door where it is best for safety and psychological reasons to have a complete barrier. The increased spacing of the main bus conductors, and a new ¾inches thick system of low-cost rectangular conductors contribute to the high current capability of this switchgear cell. Air exhausts out of the middle compartment roof sheet.

When the draw-out circuit interrupter is positioned in the switchgear cell, floor rails engage the breaker frame to provide side-to-side and upward restrains on movement of the breaker. These floor restraints along with the holding and levering mechanism rigidly holds the circuit breaker in position and allows the circuit breaker to be shipped in the cell. The heads of cap screws which pass through the floor rails engage an angle member attached to the circuit breaker to prevent side-to-side and upward movement of the breaker during shipment. The levering device prevents the breaker from moving out of the cell. The floor plates are structurally designed to allow shipment of the circuit breaker in the cell. Ventilation and conduit cutouts are placed to maintain floor strength. Channels on the cell side sheets take the side-to-side forces from the breaker and tie into the locks of the levering device.

The disclosed switchgear construction has many advantages such as the fact that every compartment is accessible from outside the cell and equipment items, such as potential transformers fuses and switches, are kept in front where they can be easily reached. Easy accessibility is especially important where walls make it difficult to gain entry from the rear. Low profile items, such as terminal blocks, fuse blocks and small knife switches, are kept on the side walls below the control module, in the first 58 inches up from the floor, where the space is usually not utilized because the breaker path is close to the wall as it is levered out of the cell. Larger items such as auxiliary switches, transformers and capacitors are mounted in the auxiliary compartment. In the rear of the switchgear cell, double potheads are mounted back to back and this saves cell depth. The main bus is put in the middle upper compartment because this space can be used straight through a switchgear line-up without blocking the use of the other compartments. Any equipment in this location is normally accessible from the roof only. It is sufficient to obtain access to the main bus from the roof or through another compartment. Also, in using the middle compartment, you obtain the flexibility of using either adjacent compartments for tie and transfer schemes. Available space is divided into compartments of such a size so that large rectangular bus conductors which have high current carrying capacity can be used.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENTS

Figure 1:
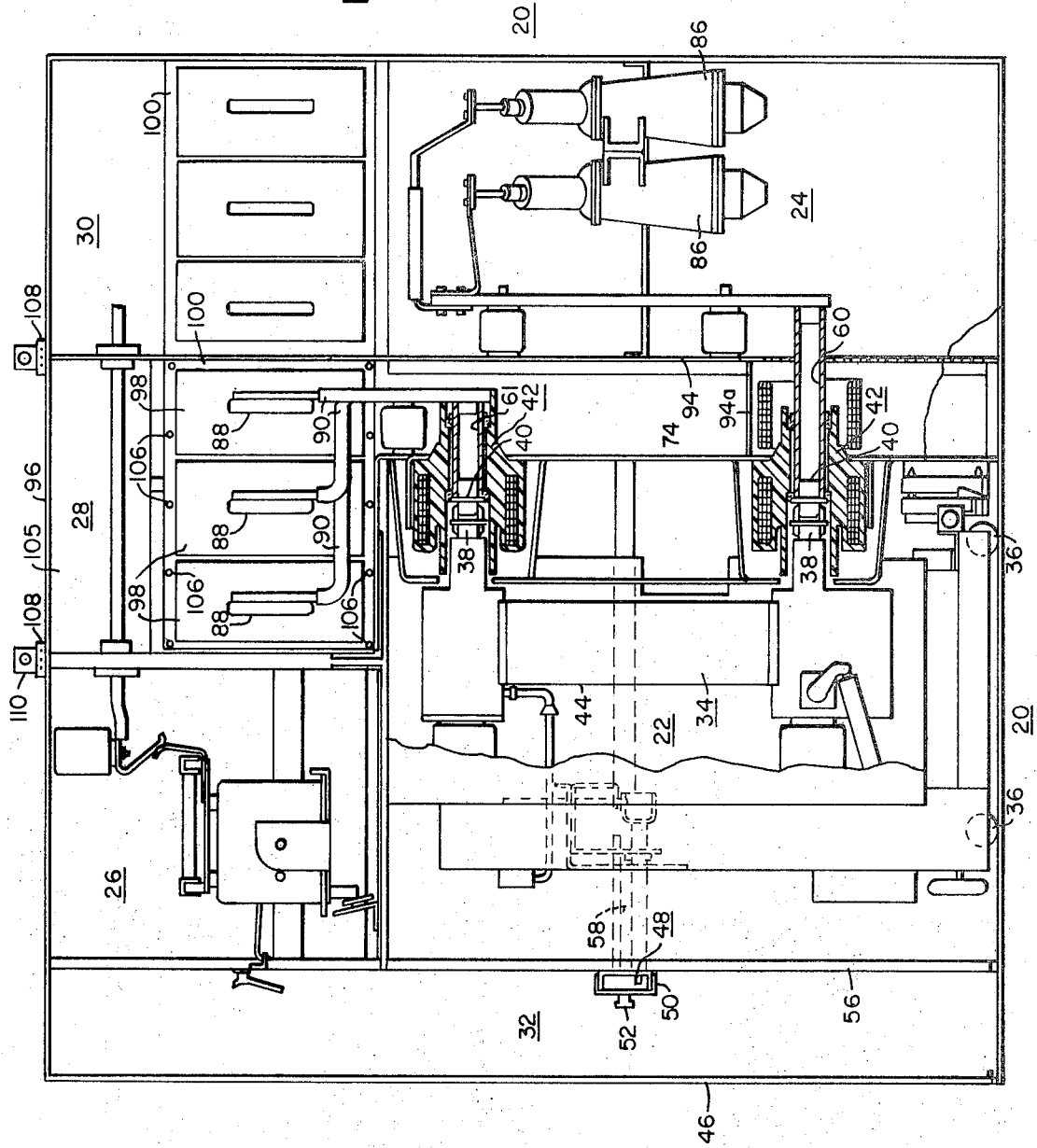
FIG. 1 illustrates a side view of a metal-clad switchgear cell having a circuit breaker in place, embodying the teachings of the present invention.

Referring to the drawings, and FIG. 1 in particular, there is shown a metal-clad switchgear cell or housing 20 which may generally be constructed by securing sheet metal members to a structural support frame. A detailed description of certain portions of the metal-clad switchgear cell 20 will be given in detail hereinafter. The metal-clad switchgear cell 20 is divided into a circuit breaker compartment 22, an incoming line compartment 24, an upper front compartment 26, an upper middle compartment 28, an upper rear compartment 30, and a control compartment 32. A circuit breaker unit 34 is disposed in the breaker compartment 22 and may be moved horizontally into and out of the cell 20 on wheels 36. In accordance with known practice, the circuit breaker 34 is provided with plug-on type primary disconnecting contacts 38, which are mounted to engage stationary primary contacts 40. The stationary primary contacts 40, which are engaged by breaker contact 38 when breaker 22 is disposed in switchgear cell 20, are mounted inside an enveloping insulating sleeves or bottles 42. The insulating bottles 42 are mounted internal to the switchgear cell 20. With the circuit breaker 34 in the operating position and closed as shown in FIG. 1, a continuous current path exists from the lower stationary contact 40 through the interrupter 44 and out the upper stationary contact 40, for each phase. A door 46 is provided at the front of cell 20 to permit the breaker 34 to be easily withdrawn from the cell 20.

Figure 2:
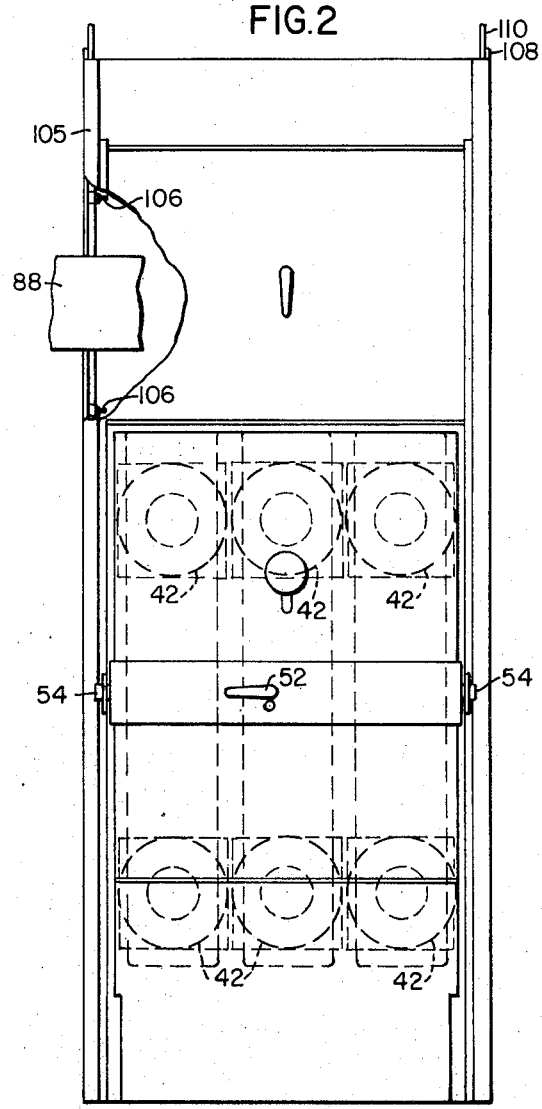
FIG. 2 is a front view of the switchgear cell shown in FIG. 1.

A holding and levering mechanism 48 is utilized for moving the circuit breaker 34 between the operating and test or disconnected positions. As best seen in FIGS. 1 and 2, the holding and levering device 48 comprises a box beam 50 constructed from two generally C-shaped channel members, During operation, the circuit breaker 34 is pushed into the cell 20 until the box beam 50 butts against a set of stops. This locates the breaker 34 in the correct position for securing the beam 50 to the cell 20. When handle 52 is rotated clockwise, this forces locking members 54 (FIG. 2) into engagement with openings in the cell structure 20, and securely fastens the beam 50 to the cell 20. With the locking members 54 engaging the cell 20, as shown in FIG. 2, and the front panel 56 of the breaker 34 against the beam 50, the breaker is in the test position. The breaker 34 is fixed and held in the test position. From the breaker test position, the circuit breaker 34 can be levered into the operating position as shown in FIG. 1 by counterclockwise rotation of the lead screw 58. For a more detailed description of the operating of the levering is mechamism 58, refer to copending application U.S. Pat. Office Ser. No. 302,623 (W.E. Case No. 40,602).

Figure 9:
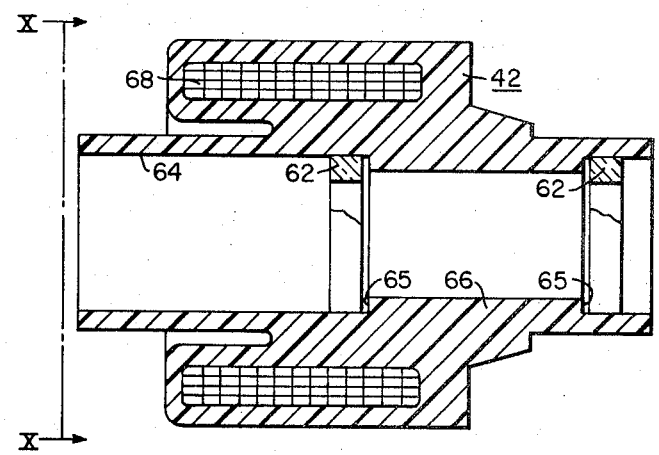
FIG. 9 shows yet another variation of the insulating contact support bottle shown in FIG. 7 with the bottle rotated 45° from the view shown in FIG. 7.

Primary stationary contact 40 is attached by suitable means to an electrically conducting tubular portion 60 which extends through and is supported by the electrically insulating bottle 42. FIG. 9 illustrates an enlarged view of the insulating bottle 42. Two electrically insulating annular rings or circular donuts 62 support the conducting tubular portion 60 and the primary stationary contact 40. The porcelain donuts 62 are disposed within a circular opening or tubular portion 64 of the insulating bottle 42. The porcelain donuts 62 can be held in place in the circular opening by an adhesive material, or by constructing the conducting tubular portion 60 and the primary stationary contact 40 to be assembled in such a manner as to mechanically retain or hold the circular donuts 62 in place. This can be accomplished by having a raised ring around the conducting tubular portion 60 and a flange on the primary stationary contact 40 so that when part 40 is assembled to part 60, donuts 62 are forced against the ends 65 of the smaller diameter portion 66 of insulating bottle 42 as shown in FIG. 1. Note that the stationary contact 40 and the conducting tube 60 are entirely supported by the porcelain donuts 62 and are spaced from, and do not contact the other insulating material of insulating bottle 42. As shown in FIGS. 1 and 9, when current transformers 68 are required, they can surround the tubular portion 64 of insulating bottle 42 and be molded in place as an integral part of insulating bottle 42 or as in FIG. 8a can be of the demountable type. A flanged portion 70 is also molded with insulating bottle 42, to facilitate mounting. The portion of insulating bottle 42 containing the current transformer 68 and the portion of the insulating bottle 42 supporting the porcelain donuts 62 can be made integral, or can be made separately and later joined by an adhesive or bonding material. Insulating bottle 42 is cast or molded from epoxy, glass-polyester, or other suitable electrically insulating material. Suitable mounting holes 72 are provided in the flange portion 70 for mounting insulating bottle 42 to the back wall 74 of breaker compartment 22. Porcelain is preferred for supporting conducting tubes 60 and primary stationary contacts 40, because of its good insulating and non-hygroscopic characteristics and anti-tracking properties. An important advantage of this construction is that the porcelain donuts 62 are not protected from breakage by the surrounding insulating bottle 42. This construction eliminates parts, lowers cost and provides a superior electrical insulation system.

Figure 8:
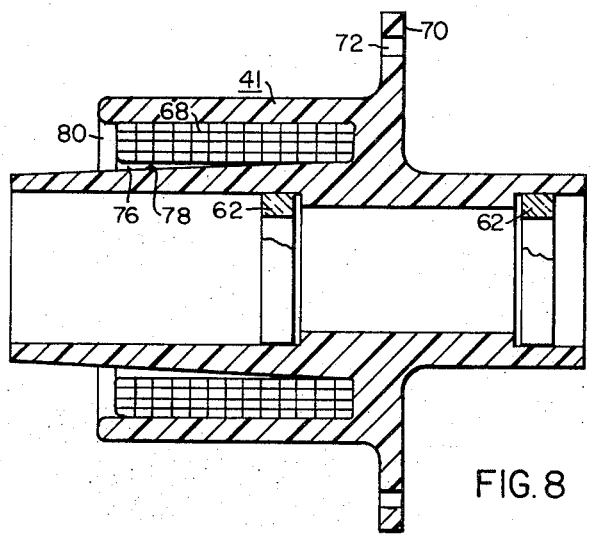
FIG. 8 shows a variation of the insulating contact support bottle shown in FIG. 7.

Referring now to FIG. 8, there is shown an insulating bottle 41 of an alternative construction. The major difference between insulating bottle 41 shown in FIG. 8 from insulating bottle 42 shown in FIG. 9 is that insulating bottle 41 does not have the current transformers 68 molded or cast in place. Rather, a cavity or recess 76 to receive the current transformer 68 is molded into insulating bottle 41. The inner wall 78 of cavity 76 has a slight slope so that when the current transformer 68 is slid or assembled into position it is tightly held by insulating bottle 41. When the current transformer 68 is disposed in cavity 76, an electrically insulating foam can be used to seal the open end 80 of cavity 76. The mounting flange 70 and holes 72 are molded integrally with insulating bottle 41. The porcelain donuts 62 are supported in insulating body 41 and function and are supported as described for insulating bottle 42.

Figure 8A:
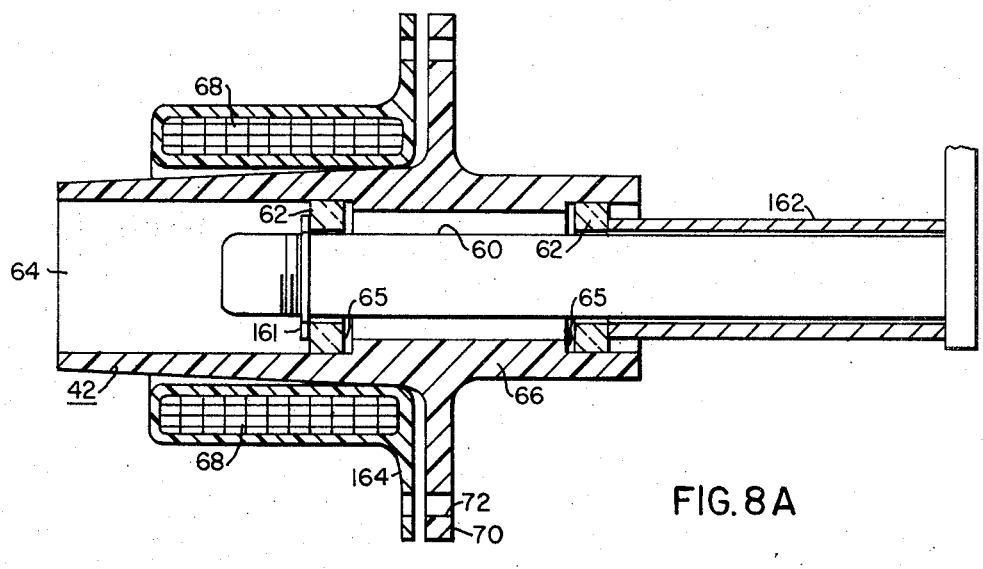
FIG. 8a shows a variation of FIG. 8 with a demountable current transformer.
Figure 10:
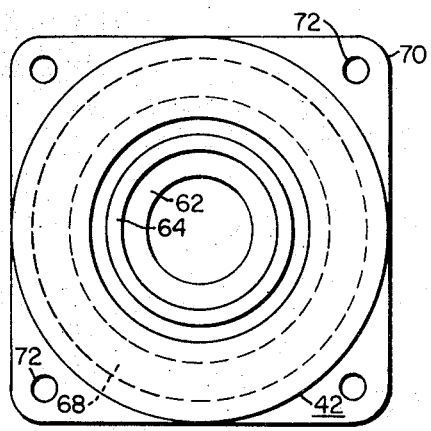
FIG. 10 is a view of the insulating bottle shown in FIG. 9 along the lines X—X.

Referring to FIG. 8a, there is shown an insulating bottle 42 with a demountable current transformer 68. The porcelain donuts 62 are held in place by a sleeve 162 at the rear of conductor 60 and a spanner nut 161 threaded on the front of conductor 60. This construction has the advantage of permitting easy removal of the current transformer 68 without disturbing insulating bottle 42. The insulating bottle 42 can be made from epoxy, glass-filled polyester, or other suitable insulating material. A flange 164 can be molded to current transformer 68 for mounting. Current transformer 68 can also be secured around insulating bottle 42 by other suitable means such as tapering the outer surface of insulating bottle 42 to provide a tight fit, or by using mounting straps or braces.

Figure 7:
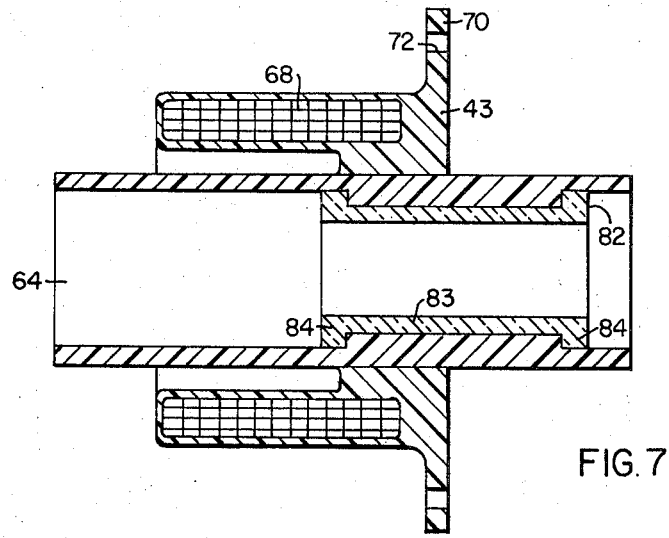
FIG. 7 shows a view in section of the insulating bottle support for the primary contact assembly.

Referring now to FIG. 7, there is shown an insulating bottle 43 constructed somewhat differently from the insulating bottle 42 shown in FIG. 9. The primary difference between insulating bottle 43 and insulating bottle 42 is that in insulating bottle 43, a single porcelain tube 82 replaces the porcelain donuts 62 of insulating bottle 42. The porcelain tube 82 has a smaller diameter portion 83 and end flange portions 84. When the insulating body 43 is molded or cast around the porcelain tube 82, the outside surface of porcelain tube 82 is surrounded by insulating material and this firmly holds the porcelain tube 82 in position. Flange 70 and mounting holes 72 are also molded on insulating bottle 43. As shown in FIG. 7, a current transformer 68, when desired, can be molded integrally with insulating bottle 43.

Referring now to FIGS. 1 and 2, it can be seen that insulating bottle 42 is mounted generally perpendicular to the rear wall 74 of the breaker compartment 22. The tubular portion 64 of insulating bottle 42 extends generally in a front to rear direction with the conducting tubular portion 60, which supports the stationary contact 40, disposed therein. There are normally two insulating bottles required per phase and in a three-phase breaker as shown in FIG. 2, a total of six insulating bottle assemblies are normally required.

Figure 3:
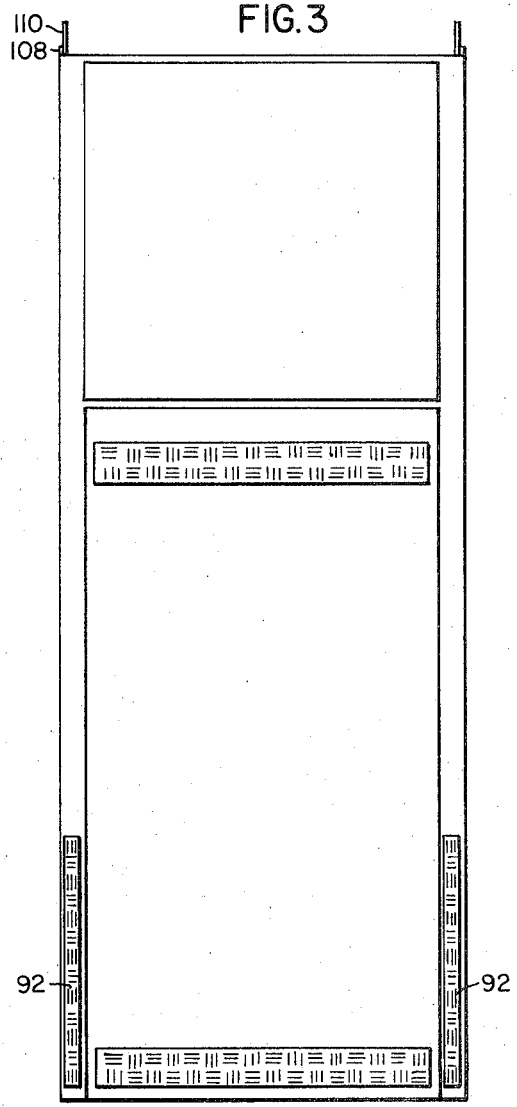
FIG. 3 is a back view of the switchgear cell shown in FIG. 1.

Incoming line feeders enter compartment 24 and terminate on potheads 86. Double potheads 86 are mounted back-to-back to reduce the required depth of cell 20. Electrical connections are made from the potheads 86 to the main bus bars 88 through circuit breaker 34. FIG. 1 shows the three main bus bars or conductors 88 for a three-phase alternating current system. The main bus bars 88 run generally perpendicular to the sides of the switchgear cell 20 and generally parallel to the front of the switchgear cell 20. The main bus bars 88 are normally disposed in the upper middle compartment 28 of switchgear cell 20 since this space can be used straight through a switchgear line-up without blocking the use of the other compartments. Also, by using the upper middle compartment 28, additional flexibility can be gained since either adjacent upper compartment 26 or 30 can be used for tied bus and transfer bus schemes. The upper electrically conducting tube 61 to which the upper stationary contact 40 is attached is connected at its opposite end to the main bus bars 88 by tie bus or conductor 90. The main bus bars 88 are self-cooled and rated up to 3,000 amps (continuous) when constructed of aluminum and up to 4,000 amps (continuous) when made of copper. No forced cooling is provided or is necessary. The bus bars are self-cooled and rely on wider spacing and natural convection principles for most of the cooling. Provisions are made in every compartment to permit the flow of air in and out. The air does not mix from compartment to compartment. To introduce air into the middle upper main bus compartment 28, two ducts are run along the sides of the cell 20. As shown in FIG. 3, cooling air enters through the grilles 92, travels through the side ducts and exits at an opening in the partition 94a shown in FIG. 1. The air then rises into the space between partitions 94 and 74 into the main bus compartment 28 and exits through grilles in the roof panel 96. The main bus structure 88 has a phase-to-phase spacing of approximately 9-½ inches which is generally greater than that used in the prior art. This reduces the tremendous forces generated by the magnetic field during high momentary currents.

Figure 5:
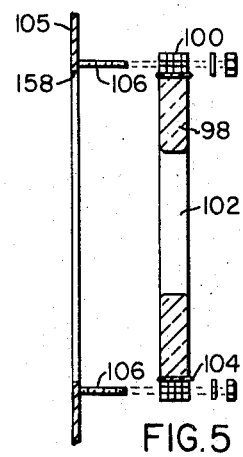
FIG. 5 is a side view showing the mounting of the main bus support to the switchgear side wall.
Figure 4:
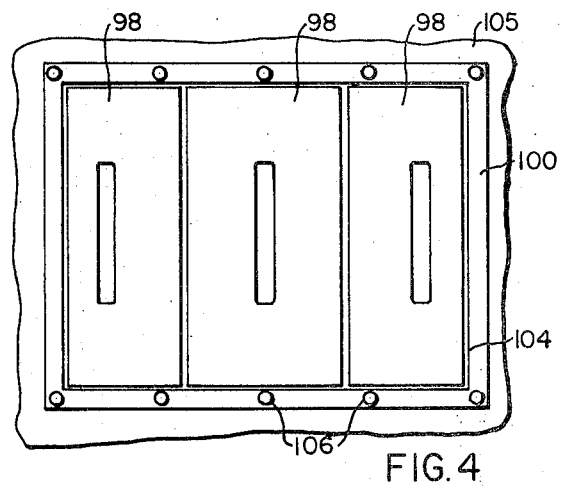
FIG. 4 is a front view of the main bus support.

The main bus is supported in a new porcelain window with the porcelain bonded to a glass-polyester frame 100 and the frame is bolted to the cell wall 105. The main bus conductors 88 pass through openings 102 in porcelain slab 98. The porcelain slabs 98 are bonded to glass-polyester frame 100 with flexible epoxy adhesive 104. FIGS. 4 and 5 show a more detailed view of the main bus 88 support. Openings 102 to receive the main bus conductors 88 are formed in the porcelain slabs 98.

Figure 6:
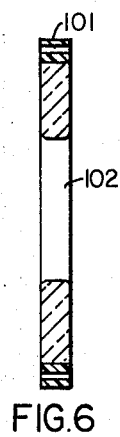
FIG. 6 is a side view showing a variation of the main bus support in which the frame is molded around the supporting porcelain slab.

The porcelain slabs 98 are held to the polyester frame 100 with a flexible epoxy adhesive 104. The porcelain slabs are held around their entire circumference by the epoxy adhesive 104. The slabs are held by both compression and tension restraints. Not only are the slabs 98 cushioned by the flexible epoxy 104, but bouncing is eliminated. The glass polyester frame 100 with the porcelain slabs 98 attached makes an assembly that is mounted on and secured to the side wall 105 of cell 20. Studs 106 are welded or otherwise suitably attached to the side wall 105 of cell 20. The frame 100 is slipped onto the studs 106 and bolted to the side wall 105 as shown in FIG. 5. In an alternate construction of the main bus support as shown in FIG. 6, the polyester frame is replaced by a completely molded or cast epoxy frame 101. This functions the same as the polyester frame 100 but it is unnecessary to bond the porcelain slabs 98 to a frame 100 with an epoxy adhesive 104 since in the construction shown in FIG. 6, the epoxy frame 101 is molded directly to the porcelain slabs 98. As shown in FIGS. 2 and 4, the studs 106 that attach the support frame 100 to the side cell wall 105 are across the top and bottom of the hole 158 cut in the side wall 105. There are no studs 106 attached along the sides of the hole 158. This allows the largest possible hole 158 to be cut in the side wall 105 permitting the largest possible air gap between the bus bars 88 and the sides of hole 158. Thus, a wider window 158 can be cut in the cell wall 105 and the dielectric clearances can be increased. Higher momentary current ratings can be achieved since the porcelain slabs 98 are held in place around their entire circumference and the spacing between the main bus bars 88 is increased thus reducing the magnetic forces.

FIG. 1 shows an alternate location for the support frame 100 and the main bus 88 in compartment 30. Bus conductors can be provided in this alternate location, in compartment 30, for tie or transfer schemes and as well in compartment 26 in the same fashion.

Figure 13:
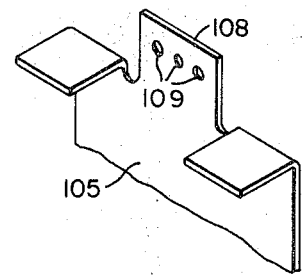
FIG. 13 shows a perspective view of the lifting tab formed on one of the side sheets.

The switchgear construction disclosed in the present application also embodies a novel lifting concept in that lifting tabs 108 are formed directly from or integrally with the side panels 105. As can best be seen in FIG. 13, the lifting tabs 108 formed from side wall 105 have several holes formed therein. Four lifting tabs 108 are formed for each switchgear cell 20. Indoor hook-on pieces 110, as shown in FIG. 1, having a large hole therein can be bolted to the lifting tabs 108 through holes 109. A spreader is used when the cell is being raised so that hook-on pieces 110 and the lifting tabs 108 are stressed in tension only.

Figure 11:
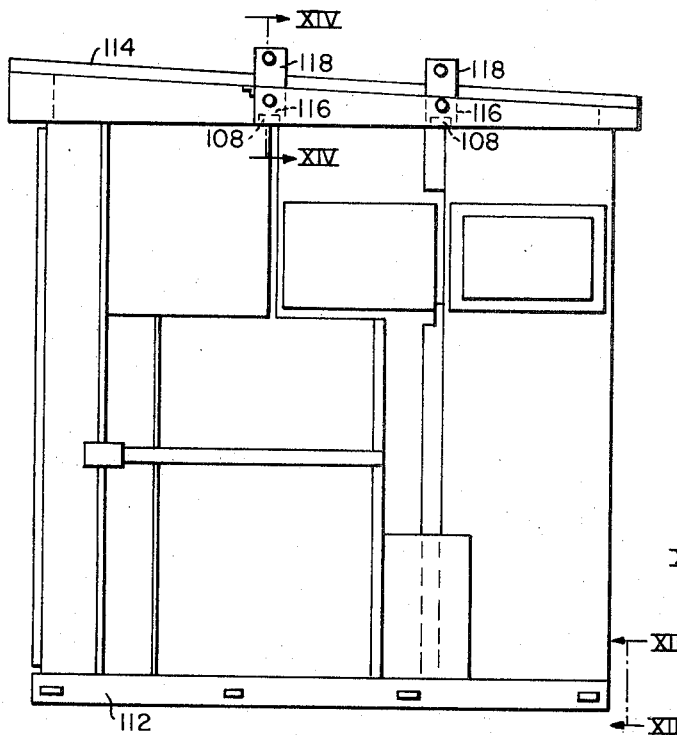
FIG. 11 shows a side view of a portion of the switchgear cell shown in FIG. 1 adapted for outdoor use.
Figure 15:
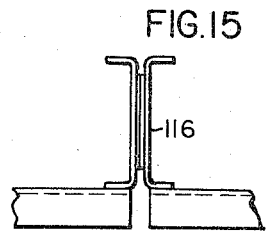
FIG. 15 illustrates a portion of the back part of the outdoor switchgear assembly shown in FIG. 14 along the lines XV—XV.
Figure 14:
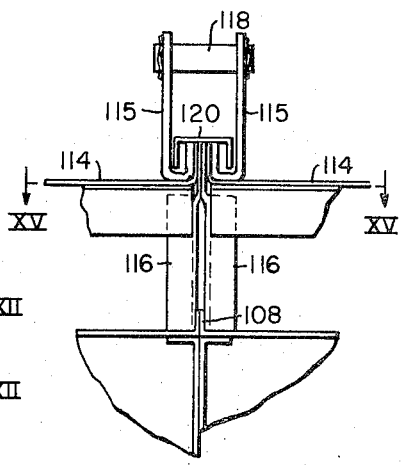
FIG. 14 shows a portion of the structure shown in FIG. 11 viewed along the lines XIV—XIV.
Figure 12:
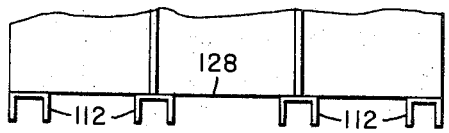
FIG. 12 shows a back view of a portion of the structure shown in FIG. 11 along the lines XII—XII.

To convert the cell 20 as shown in FIG. 1 for outdoor use, channels 112 are added under cell 20, as shown in FIG. 11 and 12, a sloping roof 114 is added onto cell 20, and gasketing is added at various locations on cell 20 to make it weatherproof. When the outdoor version of switchgear cell 20 is desired, tabs 108 formed from side panel 105 are used as roof supports. As shown in FIGS. 14 and 15, extension pieces 116 are attached to tabs 108 and these support the roof panels 114. A lifting shackle assembly 118 is tied to the roof panels 114 and the extension 116. The lifting shackle assembly 118 comprises two generally J-shaped portions 115. FIG. 14 shows the lifting arrangement in section view where two neighboring cells attach together. The short legs of the J-shaped portions 115, as can best be seen in FIG. 14, are connected to extension pieces 116 and the lip portion of roof panels 114. A lift rod is supported between the two long legs of the J-shaped portions which extend above roof panel 114. As can be seen in FIG. 14, a channel 120 is inverted and fit over the edges of the roof panels 114, where neighboring cells 20 are brought together, to weatherproof the seam between the cells 20. Thus, the cells 20 when for use outdoors, can be lifted from the roof without creating a weather sealing problem. The lifting shackle assembly 118 fits under the channel seam cover 120 to permit lifting without holes through the roof 114, which would otherwise have to be gasketed.

Figure 17:
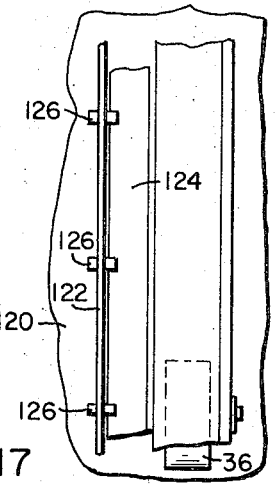
FIG. 17 illustrates a portion of the floor rail and circuit breaker shown in FIG. 16.
Figure 16:
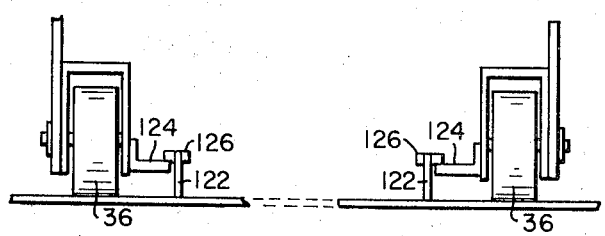
FIG. 16 illustrates a portion of the floor rail in engagement with an angle assembly attached to the drawout type circuit breaker to prevent side-to-side and upward movement of the circuit breaker.

Referring now to FIGS. 16 and 17, there is shown a floor rail assembly 122 which engages with an angle member 124 on breaker 34, when breaker 34 is disposed in breaker compartment 22. Floor rail assembly 122 engaging angle 124 prevents side-to-side and upward movement of breaker 34 during shipment. As shown, when the breaker 34 is positioned in the cell 20, angle 124 passes under the heads of cap screws 126 thus securing the breaker against up and down and side-to-side motion. The levering device 48 described previously and also described in more detail in copending application U.S. Pat. Office Ser. No. 302,623, (Westinghouse Case No. 40,602) holds the breaker from front to back movement. Thus, the breaker 34 is securely held in the cell 20 against movement in any direction and can be shipped in the cell 20. The floor plate 128 is structurally designed to allow shipment of the breaker 34 in the cell 20. Ventilation and conduct cutouts are located to maintain the strength of floor plate 128. Channels which tie into the locks of the levering device take the front to back forces from the breaker and are tied into the cell side sheets 105. The floor rail assembly 122 is attached to the floor plates 128 by suitable means, such as welding. As the breaker 34 is rolled into the breaker compartment 22, angle 124 passes closely under cap screws 126, thereby closely restricting breaker 34 movement.

Low profile items such as terminal blocks, fuse blocks and small knife switches are placed on the side wall of the control compartment 32, FIG. 1, in the first 58 inches up from the floor, where the space is usually not utilized because the breaker path is close to the wall as it is removed from the cell. The upper front compartment 26 does not usually contain the bus bars 88 and can be used for control power transformers, potential transformers, fuses, lightning arresters, disconnects, batteries, field control equipment and other desired items. These items are then kept in front where they can easily be reached. This is especially important where placement of the cell close to building walls make it difficult to get in from the rear. Also with this construction, extra cells now used in present art for control equipment can be eliminated in most applications.

A switchgear cell construction taught in accordance with the disclosed invention has several advantages over prior art cells. For example, this cell is considerably smaller for equivalent current ratings than prior art cells. The indoor version of cell 20 can be converted to an outdoor version simply and quickly by adding a sloping roof, gasketing, and channels under the floor assembly. Both indoor and outdoor cells are lifted from above. Both are lifted from the top of the cell by way of lifting tabs or hooks that allow the roof to be completely assembled at the factory. The cell can withstand higher momentary currents. A simplified insulating bottle for supporting the main stationary contacts is disclosed. Another advantage is that each compartment is accessible from outside of the cell 20. Also, the circuit breaker 34 does not have to be removed and shipped separately from the cell 20 but can be shipped inside of the cell 20.

I claim:

1. Metal-enclosed switchgear, comprising:
   a cell having an interrupter compartment including a rear wall, a terminal compartment located behind said interrupter compartment, and a plurality of bus compartments located above said interrupter compartment and said terminal compartment;
   stationary contact means located on the rear wall of said interrupter compartment;
   a draw-out circuit interrupter movable between a first position separated from said stationary contact means and a second position in engagement with said stationary contact means;
   main bus conductor means running in at least one of said bus compartments and electrically connected to a portion of said stationary contact means;
   circular porcelain supporting means surrounding a portion of said stationary contact means and supporting said stationary contact means;
   a molded insulating support having a generally circular opening therethrough with said circular porcelain supporting means disposed in the circular opening of said molded insulating support; and
   said molded insulating support being formed with an integral flange for mounting in a generally perpendicular alignment to the rear wall of said breaker compartment.

2. Metal-enclosed switchgear as claimed in claim 1, wherein said circular porcelain supporting means comprises: a generally tubular porcelain piece having flanged portions at each end thereof, and said molded insulating support is molded around said porcelain tubular member so as to substantially fill the volume between the flanged ends thereby holding said tubular porcelain member rigidly in place.

3. A combination as claimed in claim 2, including: a current transformer surrounding a portion of said tubular porcelain piece; and said current transformer is surrounded by insulating material which is integral with said molded insulating support.

4. Metal-enclosed switchgear as claimed in claim 1, wherein said circular porcelain supporting means comprises: a plurality of spaced annular rings formed from porcelain and rigidly held in the circular opening of said molded insulating support.

5. Metal-enclosed switchgear as claimed in claim 4, including a current transformer surrounding at least one of said annular porcelain rings; and said current transformer being encapsulated with insulation which is formed integrally with said molded insulating support.

6. Metal-enclosed switchgear as claimed in claim 4, wherein said molded insulating support comprises: an annular cavity, extending around the opening through said insulating support, and open at one end only; and a current transformer disposed within the annular cavity of said molded insulating support.

7. Metal-enclosed switchgear as claimed in claim 4, including: a current transformer surrounding at least one of said annular porcelain rings; and said current transformer being supported around a portion of said molded insulating support by external support means.

8. Metal-enclosed switchgear as claimed in claim 1, including: a side wall for said cell having an opening therein through which said main bus conductor means pass; main bus support means attached to said side wall; said main bus support means comprising a plurality of spaced porcelain slabs having openings therein through which said main bus conductor means pass; a polyester frame having a generally rectangular surrounding said multiple porcelain slab; and a flexible epoxy adhesive surrounding the outer circumference of each of said multiple porcelain slabs and holding said multiple porcelain slabs fixedly to said polyester frame.

9. Metal-enclosed switchgear as claimed in claim 8, wherein: said polyester mounting frame has mounting holes formed along the top and bottom edges only.

10. Metal-enclosed switchgear as claimed in claim 1, including: a side panel for said cell with an opening therein through which said main bus conductor means pass; a main bus support comprising porcelain slabs, through which said main bus conductor means pass, rigidly held in a cast epoxy frame; and said cast epoxy frame being attached along its top and bottom edges only cover the opening through said side panel.

11. Metal-clad switchgear as claimed in claim 1, including: a side panel for said switchgear cell; and a lifting tab formed integrally with said side panel and extending above the top of said switchgear cell.

12. Metal-enclosed switchgear as claimed in claim 11, including: a plurality of channel members mounted underneath said cell to raise the bottom of said switchgear cell; a plurality of elongated roof panels mounted on top of said switchgear cell in a side-by-side relationship; and roof support means attached at one end to said roof panels and at the other end to said lifting tabs.

13. Metal-enclosed switchgear as claimed in claim 12, including: lifting means attached to said roof panel and to said roof supporting means; said lifting means comprising two generally J-shaped pieces having a long leg and a short leg; said short leg being attached to said roof supporting means and said long leg extending above the roof supporting means as a lifting member.

14. Metal-enclosed switchgear as claimed in claim 13, including: a plurality of channel-shaped weatherproofing members being inverted and disposed over said roof support means, said short legs of said lifting means, and the edges of said roof panels.

15. Metal-enclosed switchgear as claimed in claim 1, including: a base plate forming the floor of said switchgear cell and having sufficient structural strength to support said circuit interrupter; a levering in and holding means for rigidly engaging said switchgear cell and for moving said circuit interrupter between a first position separated from said stationary contact means and a second position in engagement with said stationary contact means; said levering in and holding means being capable of substantially preventing front to rear motion of said circuit interrupter; hold down means attached to said base plate and engaging said circuit interrupter when said circuit interrupter is disposed in said interrupter compartment to prevent side-to-side movement and up and down movement of said circuit interrupter; and said levering in and said holding means containing said circuit interrupter against any substantial movement whereby said circuit interrupter can be shipped in said switch-gear cell.

16. Metal-enclosed switchgear as claimed in claim 15, wherein said hold-down means comprises: angle members attached to said circuit interrupter, a plate member attached to said base plate and extending upwardly perpendicular to said base plate, protruding members attached to the top of said plate member so that when said circuit interrupter is disposed in said interrupter compartment, said angle members pass under said protruding members and limit the movement of said circuit interrupter.

17. Metal-enclosed switchgear as claimed in claim 8, including: ventilating means for introducing air into one of said multiple bus compartments; said ventilating means being disposed to provide for the free flow of air into and out of the compartment without mixing with the air from any other compartment.

* * * * *